United States Patent
Catovic et al.

(10) Patent No.: US 9,210,586 B2
(45) Date of Patent: Dec. 8, 2015

(54) METHOD AND APPARATUS FOR GENERATING AND EXCHANGING INFORMATION FOR COVERAGE OPTIMIZATION IN WIRELESS NETWORKS

(75) Inventors: Amer Catovic, San Diego, CA (US); Flavio De Angelis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 12/761,189

(22) Filed: Apr. 15, 2010

(65) Prior Publication Data

US 2010/0284303 A1   Nov. 11, 2010

Related U.S. Application Data

(60) Provisional application No. 61/176,644, filed on May 8, 2009.

(51) Int. Cl.
*H04W 24/02* (2009.01)
*H04W 16/18* (2009.01)

(52) U.S. Cl.
CPC .......... *H04W 24/02* (2013.01); *H04W 16/18* (2013.01)

(58) Field of Classification Search
None
See application file for complete search history.

(56) References Cited

U.S. PATENT DOCUMENTS

| | | | |
|---|---|---|---|
| 6,108,321 A * | 8/2000 | Anderson et al. | 370/329 |
| 6,829,491 B1 * | 12/2004 | Yea et al. | 455/560 |
| 7,142,523 B1 * | 11/2006 | Chekuri et al. | 370/328 |
| 7,317,922 B2 * | 1/2008 | Baccelli | H04W 24/00 455/450 |
| 7,835,301 B1 * | 11/2010 | Maufer | 370/254 |
| 8,406,759 B2 * | 3/2013 | Ryan et al. | 455/435.1 |
| 2005/0136911 A1 | 6/2005 | Csapo et al. | |
| 2006/0128371 A1 * | 6/2006 | Dillon et al. | 455/423 |
| 2008/0268833 A1 * | 10/2008 | Huang et al. | 455/425 |
| 2009/0264130 A1 * | 10/2009 | Catovic et al. | 455/436 |
| 2010/0329150 A1 * | 12/2010 | Nielsen | 370/254 |
| 2011/0009105 A1 | 1/2011 | Lee et al. | |
| 2011/0045835 A1 | 2/2011 | Chou et al. | |
| 2011/0195707 A1 | 8/2011 | Faerber et al. | |
| 2012/0108232 A1 * | 5/2012 | Viering et al. | 455/424 |

(Continued)

FOREIGN PATENT DOCUMENTS

| | | | |
|---|---|---|---|
| CN | 101132190 A | 2/2008 | |
| CN | 101132643 A | 2/2008 | |

(Continued)

OTHER PUBLICATIONS

Anton Ambrosy et al: "Self-configuration and self-optimization of 4G Radio Access Networks (IEEE C802.16m-07/169)" IEEE C802.16M-07/169, [Online Aug. 29, 2007, pp. 1-9, XP002565296 Retrieved from the Internet : URL: http://iese802.org/16> [retrieved on Jan. 26, 2010].

(Continued)

*Primary Examiner* — Timothy J Weidner
(74) *Attorney, Agent, or Firm* — Paul Kuo

(57) ABSTRACT

The subject specification is directed towards generating and exchanging information for coverage optimization in wireless networks. Aspects are disclosed for facilitating a distributed coverage optimization. A communication is established with at least one external entity, and a coverage-related measurement is received from the at least one external entity. A coverage parameter is then self-optimized as a function of the coverage-related measurement.

43 Claims, 12 Drawing Sheets

(56) References Cited

U.S. PATENT DOCUMENTS

| | | |
|---|---|---|
| 2013/0242720 A1 | 9/2013 | Chou |
| 2013/0301531 A1* | 11/2013 | Tao .............................. 370/328 |
| 2014/0369336 A1 | 12/2014 | Prakash et al. |

FOREIGN PATENT DOCUMENTS

| | | |
|---|---|---|
| EP | 2200352 A1 | 6/2010 |
| JP | H099345 A | 1/1997 |
| JP | 2007306407 A | 11/2007 |
| WO | 2008096383 A1 | 8/2008 |
| WO | 2008136415 A1 | 11/2008 |
| WO | 2009048088 A1 | 4/2009 |
| WO | 2009052754 A1 | 4/2009 |

OTHER PUBLICATIONS

Huawei et al: "SON architecture for self-optimization" 3GPP Draft; S5-080450R1 Update of SON Architecture for Self Optimization, 3rd Generation Partnership Project (3GPP), Mobile Competence Centre; 650, Route Des Lucioles; F-06921 Sophia-Antipolis Cedex; France, vol. SA WG5, no. Chengdu, China; Apr. 13, 2008, XP050307237.

International Search Report and Written Opinion—PCT/US2010/034137—ISA/EPO—Oct. 7, 2010.

Nec et al: "UE assistance for self-optimizing of network" 3GPP Draft; R2-072432, 3rd Generation Partnership Project (3GPP), Mobile Competence Centre; 650, Route Des Lucioles; F-06921 Sophia-Antipolis Cedex ; France, vol . RAN WG2, no. Orlando, USA; Jun. 22, 2007, XP050135267.

QUALCOMM Europe: "Automatic Measurement Collection for RF optimization" 3GPP Draft; R3-072118 Automatic Measurement Collection for RF Optimization, 3rd Generation Partnership Project (3GPP), Mobile Competence Centre ; 650, Route Des Lucioles; F-06921 Sophia-Antipolis Cedex ; France, vol. RAN WG3, no. Jeju Island; Oct. 31, 2007, XP050162906.

Sujuan Feng et al: "Self-organizing Networks (SON) in 3GPP Long Term Evolution" Internet Citation May 20, 2008, pp. 1-15, XP007907980 Retrieved from the Internet: URL: http://www.nomor.de/uploads/gc/TQ/gcTQ fDWApo9osPfQwQoBzw/Self Organising Networks InLTE-2008-05.pdf [retrieved on Mar. 27, 2009].

NTT DoCoMo, Orange, AT&T, T-Mobile, China Mobile, Telecom Italia, Telefonica, TeliaSonera: KPN, "Initial list of eNB measurements", R1-072929, 3GPP , Jun. 29, 2007.

NTT DoCoMo, T-Mobile, Telecom Italia, China Mobile, Vodafone, Telefonica, TeliaSonere, Orange, "Clarification of work split on eNB measurements", R3-071258, 3GPP, Jun. 14, 2007.

Taiwan Search Report—TW099114861—TIPO—Mar. 6, 2013.

Nokia et al: 3GPP TSG-RAN WG2 Meeting #66 R2-093231, San Francisco, CA, May 4-8, 2009, URL: www.3gpp.org/ftp/tsg_ran/wg2_rl2/TSGR2_66/Docs/R2-093231.zip.

Scully N., et al., "Use cases for Self-Organising Networks", INFO-ICT-216284 Socrates D2.1, Mar. 31, 2008, pp. 1, 38-39, XP002536215, Retrieved from the Internet: URL: http://www.fp7-socrates.eu/files/Deliverables/SOCRATES_D2.1%20Use%20cases%20for%20self-organising%20networks.pdf [retrieved on Jul. 9, 2009].

ZTE: "Coverage and Capacity optimization", 3GPP Draft; R3-101542 C&C Discussion, 3rd Generation Partnership Project (3GPP), Mobile Competence Centre; 650, Route Des Lucioles; F-06921 Sophia-Antipolis Cedex; France, vol. RAN WG3, no. Montreal, Canada; May 10, 2010, May 1, 2010, pp. 1-7, XP050425299, [retrieved on May 1, 2010].

* cited by examiner

METHOD AND APPARATUS FOR GENERATING AND EXCHANGING INFORMATION FOR COVERAGE OPTIMIZATION IN WIRELESS NETWORKS

CROSS-REFERENCE TO RELATED APPLICATIONS

This application claims the benefit of U.S. Provisional Patent application Ser. No. 61/176,644 entitled "Method and Apparatus for Generating and Exchanging Information for Coverage Optimization in Wireless Networks," which was filed May 8, 2009. The aforementioned application is herein incorporated by reference in its entirety.

BACKGROUND

I. Field

The following description relates generally to wireless communications, and more particularly to methods and apparatuses for generating and exchanging information to facilitate a distributed coverage optimization.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Particular developments in wireless communications have been directed towards improving coverage and capacity. Indeed, providing adequate quality of serving cell coverage and extending network capacity are highly desirable objectives of network optimization activities performed by network operators. Looking for ways to reduce cost of coverage and capacity optimization (CCO) in the network is particularly important for operators' Return on Investment (ROI). Accordingly, standardization of Self-optimizing Network (SON) capabilities is currently being pursued in 3GPP, wherein CCO is one of the major functionalities of SON-capable networks being standardized in 3GPP. Current SON-capable networks, however, are often inefficient since they rely too heavily on a centralized infrastructure for performing such self-optimizations. It would thus be desirable to develop a method and apparatus for facilitating a more efficient SON-capable network.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with generating and exchanging information for coverage optimization in wireless networks. In one aspect, methods and computer program products are disclosed for facilitating a distributed coverage optimization. Within such embodiments, a communication is established with at least one external entity, and a coverage-related measurement is received from the at least one external entity. A coverage parameter is then self-optimized as a function of the coverage-related measurement.

In another aspect, an apparatus configured to facilitate a distributed coverage optimization is disclosed. Within such embodiment, the apparatus includes a processor configured to execute computer executable components stored in memory. The computer executable components include a communication component and an optimization component. For this embodiment, the communication component is configured to receive at least one coverage-related measurement from at least one external entity, whereas the optimization component is configured to self-optimize a coverage parameter as a function of the at least one coverage-related measurement.

In a further aspect, another apparatus is disclosed. Within such embodiment, the apparatus includes means for establishing, means for receiving, and means for self-optimizing. For this embodiment, the means for establishing establishes a communication with at least one external entity, whereas the means for receiving includes means for receiving a coverage-related measurement from the at least one external entity. The means for self-optimizing self-optimizes a coverage parameter as a function of the coverage-related measurement. The apparatus may also include a means for generating a coverage report based on the coverage-related measurement, and a means for ascertaining a set of coverage-related statistics to include in the coverage report. Within such embodiment, the set of coverage-related statistics are computed across the coverage-related measurement.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
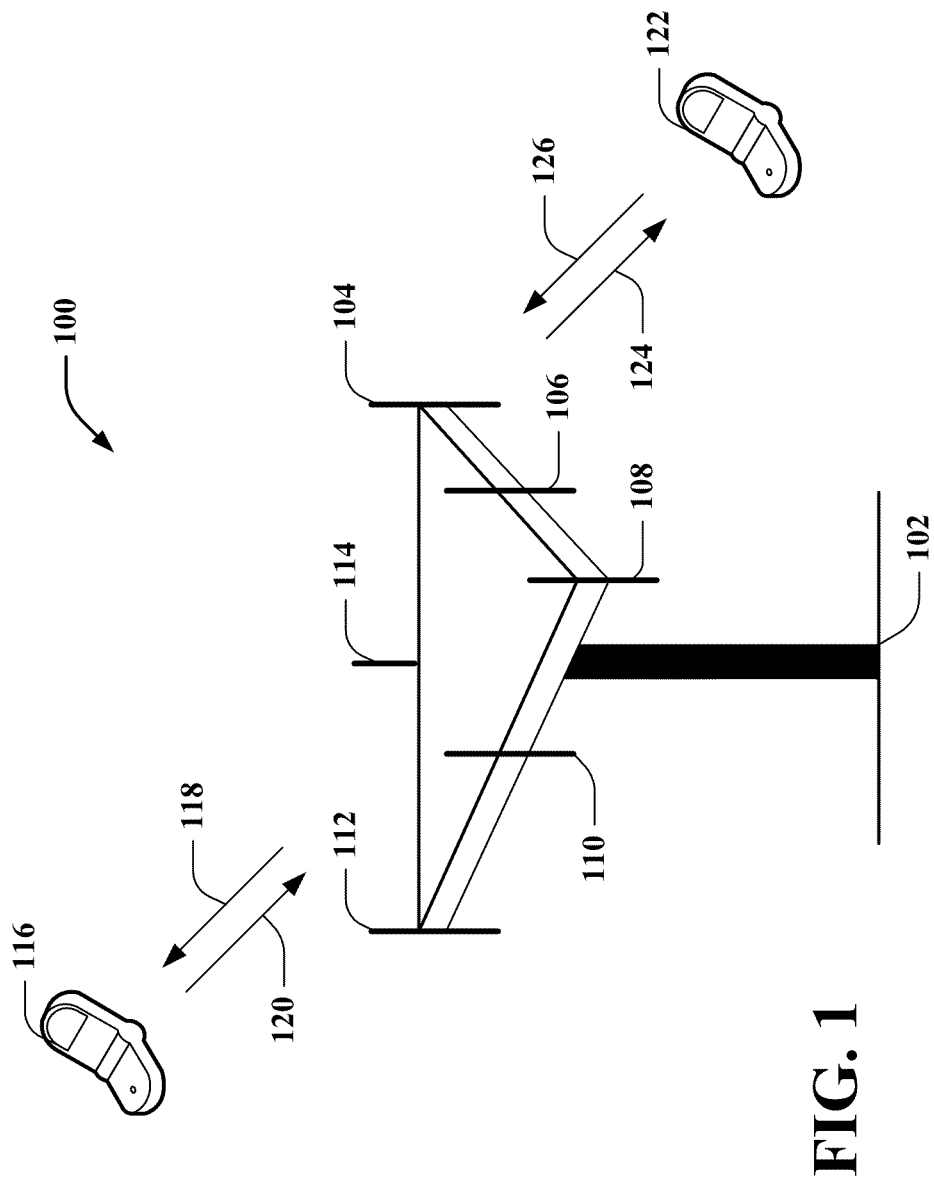
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification discloses a method and apparatus directed towards generating and exchanging information to facilitate self-coverage and capacity optimization (CCO). To this end, it is first noted that several methods are contemplated for performing self-CCO in a network automatically (i.e., performed without or with minimal human intervention). For instance, a centralized approach is contemplated in which a central entity in the network performs CCO in a given network area. Such a centralized approach can be based on coverage/capacity-related information collected by network elements (e.g. Base Stations, evolved Node Bs, etc.) and/or UEs made available to the central entity to be used as input into CCO algorithms. The subject specification, however, is directed towards a distributed optimization. Within such embodiment, network elements perform their own CCO based on information available within the network element, exchanged with other network elements, and/or reported by wireless terminals served by the network element.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), or some other terminology. Similarly, various embodiments are described herein in connection with access point base stations, wherein an access point base station can also be utilized for communicating with access terminal(s), and wherein access point base stations may be referred to as a femto cells, Home Node B units (HNBs), Home Evolved Node B units (HeNB), or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring base stations can be subject to less interference as compared to a base station transmitting through a single antenna to all its access terminals.

Figure 2:
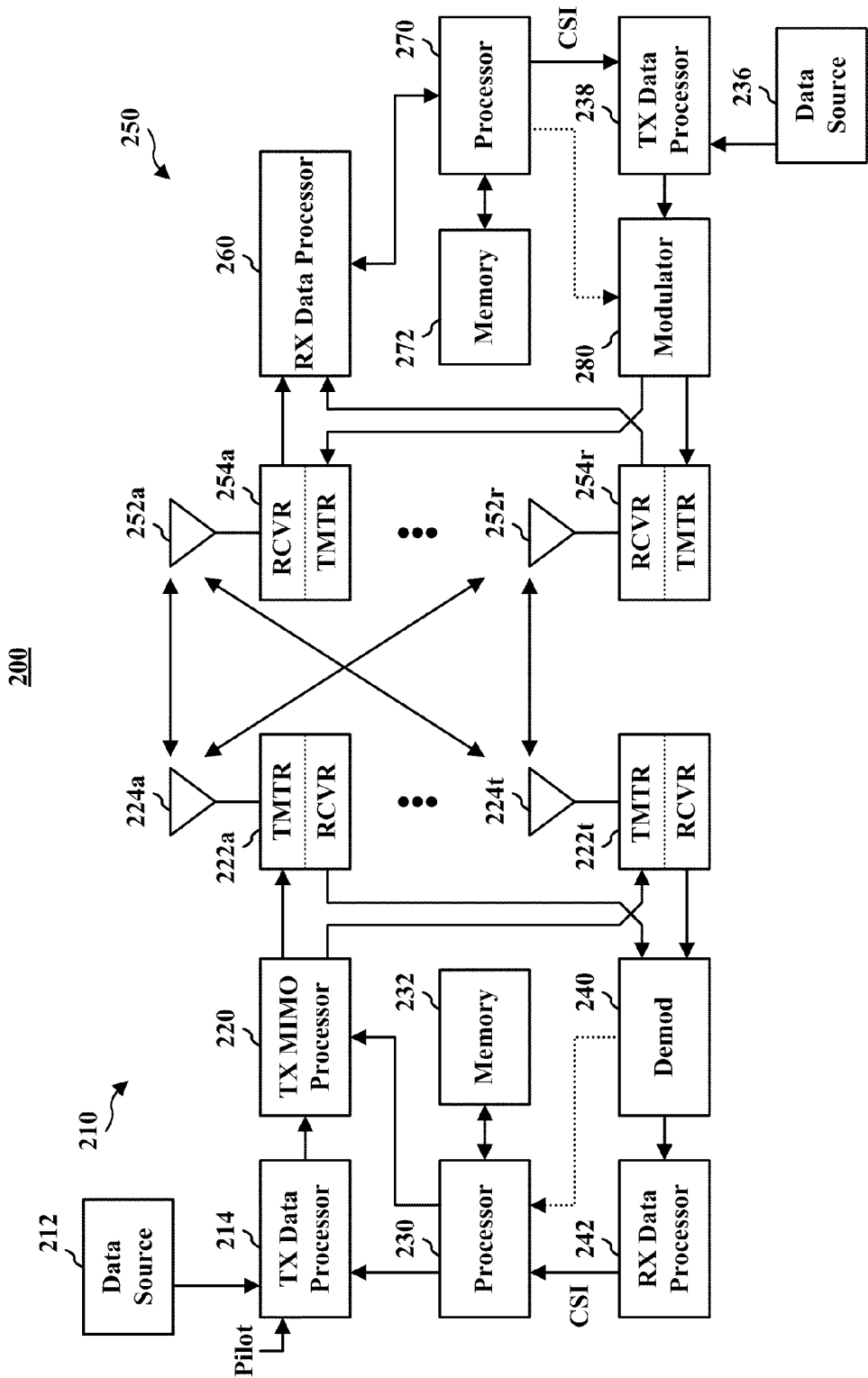
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
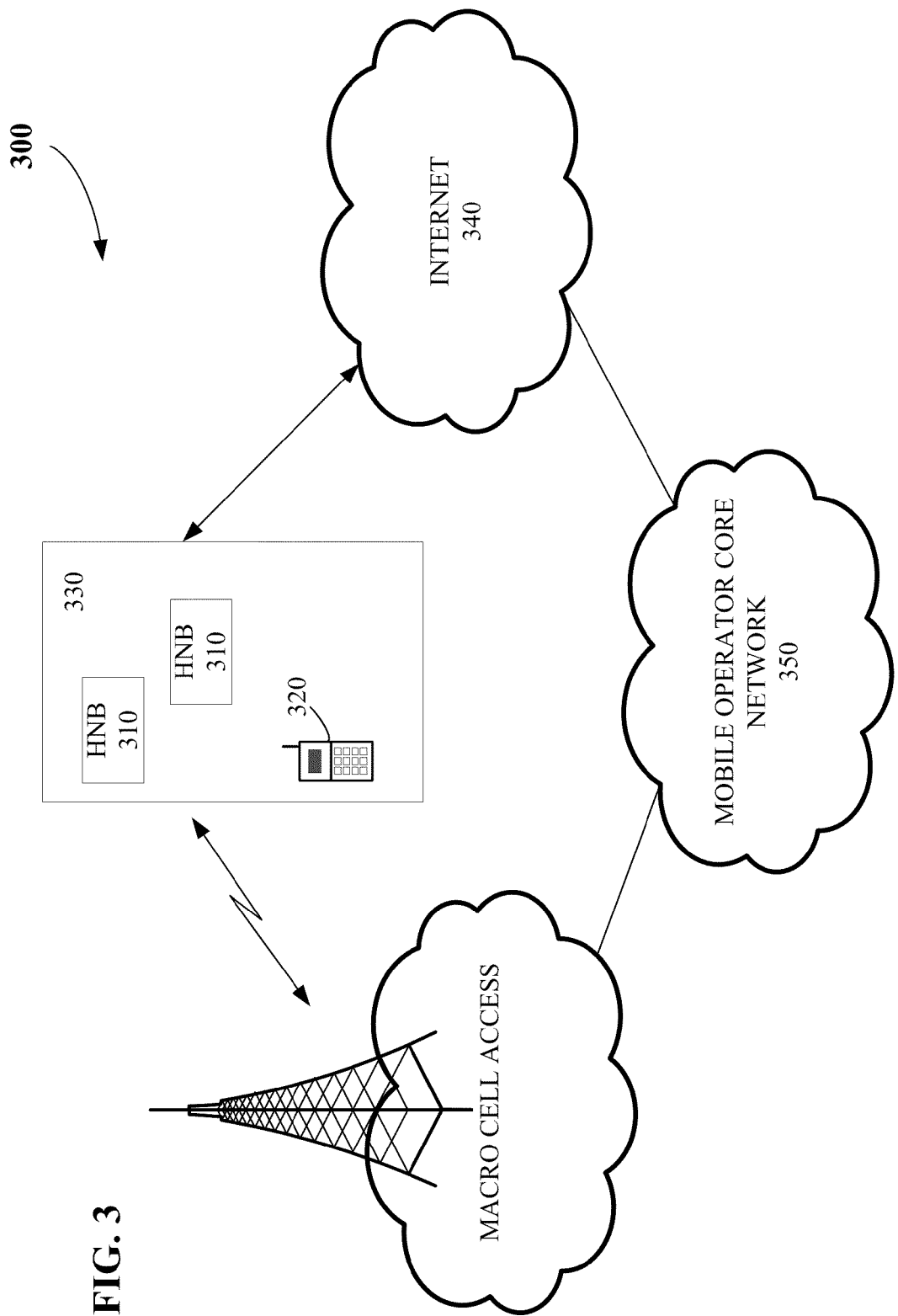
FIG. 3 illustrates an exemplary communication system that enables deployment of access point base stations within a network environment.

FIG. 3 illustrates an exemplary communication system to enable deployment of access point base stations within a network environment. As shown in FIG. 3, the system 300 includes multiple access point base stations or, in the alternative, femto cells, Home Node B units (HNBs), or Home evolved Node B units (HeNBs), such as, for example, HNBs 310, each being installed in a corresponding small scale network environment, such as, for example, in one or more user residences 330, and being configured to serve associated, as well as alien, user equipment (UE) or mobile stations 320. Each HNB 310 is further coupled to the Internet 340 and a mobile operator core network 350 via a DSL router (not shown) or, alternatively, a cable modem (not shown).

Figure 4:
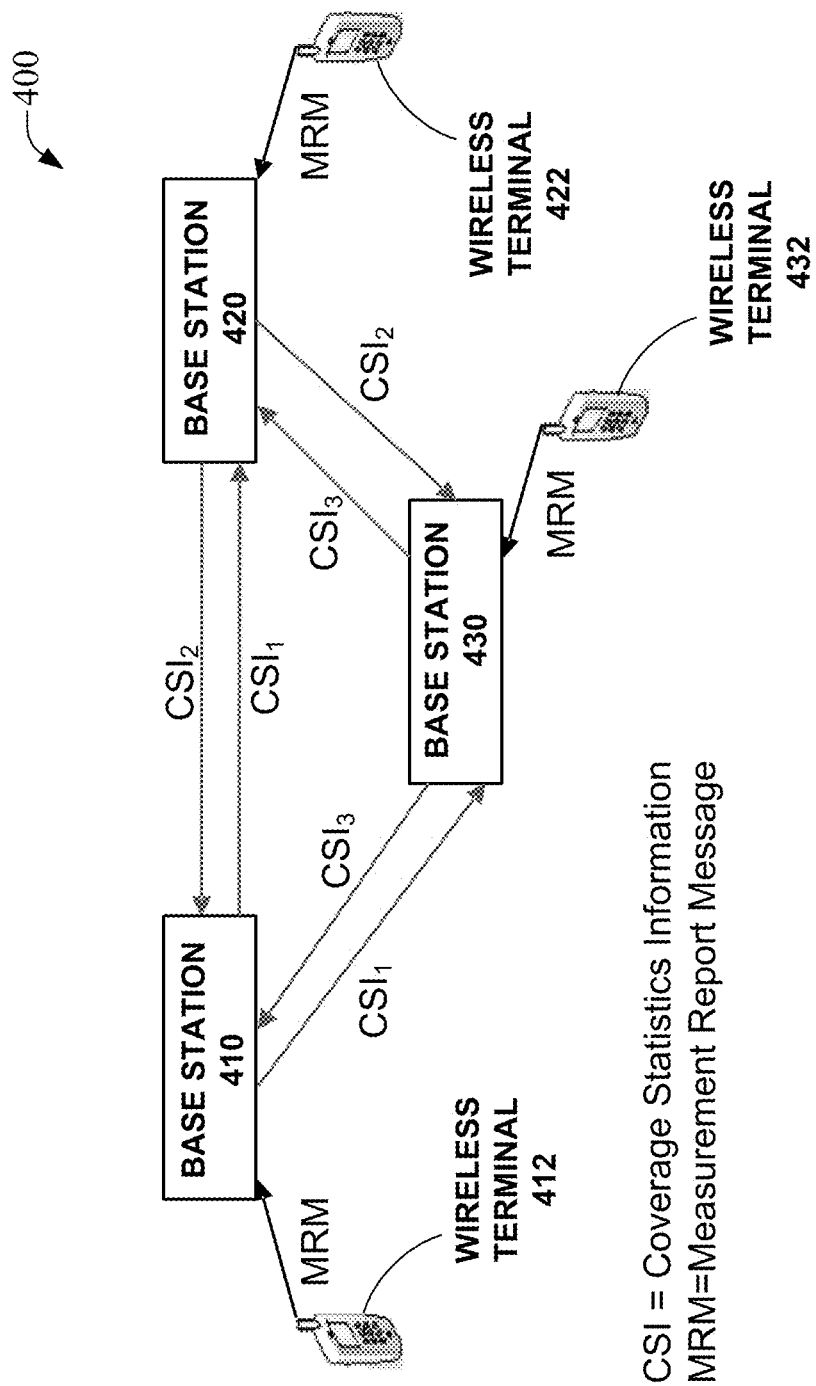
FIG. 4 is an overview of an exemplary environment that facilitates a distributed coverage optimization in accordance with an aspect of the subject specification.

The subject specification is generally directed towards various aspects for facilitating a distributed coverage optimization. In particular, embodiments are disclosed which are directed towards an information exchange concept for purposes of automatic distributed CCO, semantics of the information being exchanged, and a method for computing the information to be exchanged. To this end, an overview of an exemplary system that facilitates a distributed coverage optimization in accordance with an aspect of the subject specification is provided in FIG. 4. As illustrated, system 400 includes a plurality of base stations 410, 420, 430, which respectively serve wireless terminals 412, 422, 432. For this particular embodiment, information is exchanged between base stations 410, 420, 430 for purposes of CCO. In an aspect, base stations 410, 420, 430 exchange information directly about long-term coverage statistics in the cells they parent. Within such embodiment, the statistics reflect measurements collected by base stations 410, 420, 430 and/or by wireless terminals 412, 422, 432, which are connected to the cells parented by base stations 410, 420, 430. In a particular aspect, information is packed into a specific message (e.g., CSI—Coverage Statistics Information, which is a generic name used herein) to be exchanged between eNBs using standardized protocols, such as X2 AP (3GPP TS 36.423) or S1 AP (TS 36.421). Here, it should be noted that information can be exchanged via any of a plurality of mechanisms including, for example, periodically (where the period may be configurable by a network operator), per request by a base station, and/or triggered by particular configurable events (e.g. when a load in a cell exceeds a certain threshold, etc.).

With respect to semantics, it should be noted that an eNB can exchange coverage-related statistics which reflect any of a plurality of characteristics. For instance, in an aspect, such statistics may reflect downlink/uplink coverage quality in a cell, received downlink/uplink power, received downlink/uplink interference power, received downlink interference power from a specific neighbor, UE transmit power level, cell geometry, and/or path loss in a cell.

In a further aspect, coverage-related statistics are computed using either internal eNB measurements and/or UE measurement report messages (MRMs), wherein a time scale over which the statistics are computed can be configured by a network operator. In a particular embodiment, the coverage-related statistics are computed over a sufficiently long time period to cover any of a plurality of variations including, for example, variations in UE geographical distributions, loading of the serving cell and neighboring cells, and/or UE mobility patterns.

Here, it should be noted that the method to compute coverage statistics exchanged between eNBs can be standardized. For instance, the definition of each statistics exchanged can be standardized. Another approach, however, is to have the method for computing coverage statistics not standardized. For example, average cell geometry can be defined as a number between 0 and 1, where a lower number is associated with a lower geometry. For this embodiment, an eNB can then simply indicate its average geometry as 0.5, without indicating how it is computed. Similarly, an eNB parenting a cell i can advertize an interference coefficient $IC_{i,j}$ to describe a level of interference received in cell i from cell j (e.g., $IC_{i,j}=0.5$), without specifying how it is computed. In this case, what may be standardized is the semantics (i.e., meaning) of each statistic and its range (e.g., 0 to 1).

As stated previously, an eNB can compute coverage statistics from internal measurements and/or UE MRMs. As per a serving cell and/or neighbor cell, an eNB can configure UEs served by that eNB to collect and report measurements of signal quality. In an aspect, a UE can measure and report signal quality of a serving cell as well as of neighboring cells. For instance, an eNB can configure UEs to measure and report a Reference Signal Received Power (RSRP) level of a serving cell and/or neighbor cell, a Reference Signal Received Quality (RSRQ) level of a serving cell and/or neighbor cell, a Radio Signal Strength Indication (RSSI) level, a UE transmit power level, other measurements specified by a particular protocol (e.g., 3GPP TS 36.423). Here, it should also be noted that measurement reports can be configured as periodical and/or triggered.

Figure 5:
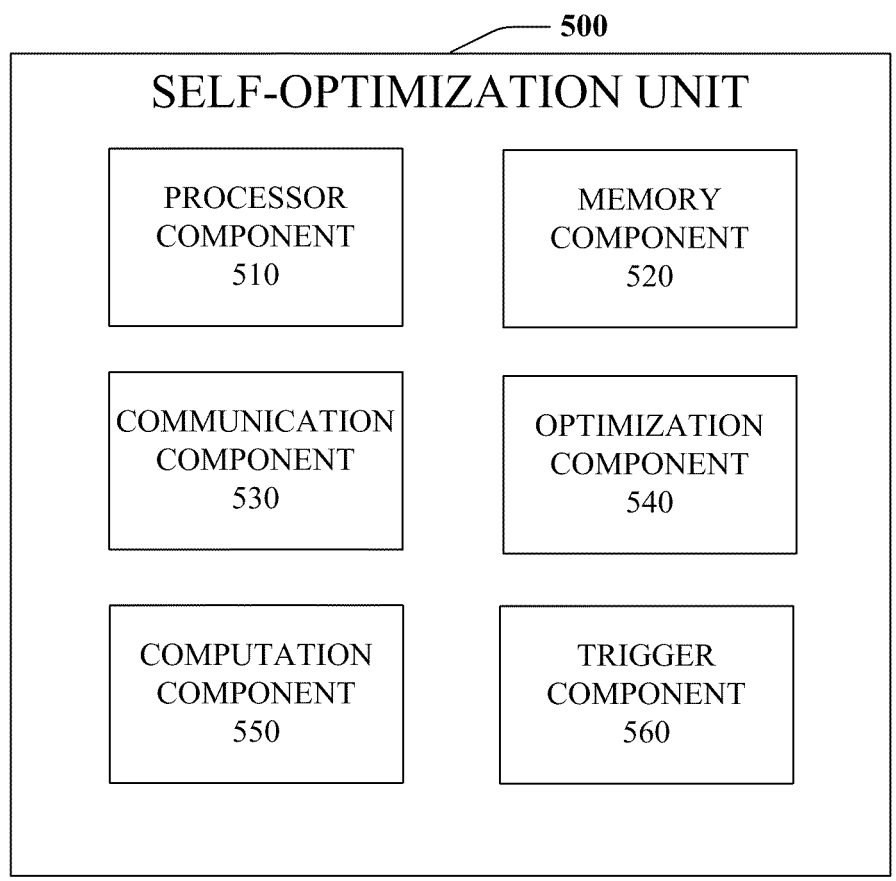
FIG. 5 illustrates a block diagram of an exemplary self-optimization unit that facilitates a distributed coverage optimization in accordance with an aspect of the subject specification.

Referring next to FIG. 5, a block diagram of an exemplary self-optimization unit that facilitates a distributed coverage optimization according to an embodiment is provided. As shown, self-optimization unit 500 may include processor component 510, memory component 520, communication component 530, optimization component 540, computation component 550, and trigger component 560. Here, it should be appreciated that self-optimization unit 500 may reside in a base station (e.g., eNB) or access point base station (e.g., HeNB), for instance.

In one aspect, processor component 510 is configured to execute computer-readable instructions related to performing any of a plurality of functions. Processor component 510 can be a single processor or a plurality of processors dedicated to analyzing information to be communicated from self-optimization unit 500 and/or generating information that can be utilized by memory component 520, communication component 530, optimization component 540, computation component 550, and/or trigger component 560. Additionally or alternatively, processor component 510 may be configured to control one or more components self-optimization unit 500.

In another aspect, memory component 520 is coupled to processor component 510 and configured to store computer-readable instructions executed by processor component 510. Memory component 520 may also be configured to store any of a plurality of other types of data including data generated by any of communication component 530, optimization component 540, computation component 550, and/or trigger component 560. Memory component 520 can be configured in a number of different configurations, including as random access memory, battery-backed memory, hard disk, magnetic tape, etc. Various features can also be implemented upon memory component 520, such as compression and automatic back up (e.g., use of a Redundant Array of Independent Drives configuration).

In another aspect, communication component 530 is also coupled to processor component 510 and configured to interface self-optimization unit 500 with external entities. For instance, communication component 530 may be configured to receive coverage-related measurements from external entities, and to report coverage reports generated by computation component 550. Here, it should be noted that such external entities may include wireless terminals and/or base stations, wherein communication component is configured to facilitate particular communications. For example, with respect to wireless terminals, communication component 530 may be further configured to provide wireless terminals with configuration data so as to configure the wireless terminals to collect particular coverage-related measurements. With respect to base stations, however, communication component 530 may be further configured to facilitate a backhaul connection with particular base stations (e.g., via an S1 or X2 interface).

As illustrated, self-optimization unit 500 may further include optimization component 540 and computation component 550. Within such embodiment, optimization component 540 is configured to self-optimize a coverage parameter as a function of at least one coverage-related measurement, whereas computation component 550 is configured to provide a coverage report based on the at least one coverage-related measurement. In a particular embodiment, computation component 550 is further configured to determine a set of coverage-related statistics to include in the coverage report. It should be noted that the set of coverage-related statistics may be associated with any of a plurality of characteristics including, for example, a coverage quality (e.g., a downlink/uplink coverage quality in a cell), a received power (e.g., a received downlink/uplink power), a received interference power (e.g., a received downlink/uplink interference power), a received downlink interference power from a specific neighbor, a user equipment transmit power, a cell geometry, and/or a path loss in a cell.

In a further aspect, computation component 550 is configured to compute the set of coverage-related statistics across the at least one coverage-related measurement. For instance, computation component 550 may be configured to compute an average, a maximum, and/or a minimum across the at least one coverage-related measurement. Within such embodiment, computation component 550 may be further configured to perform such computations across any of a plurality of coverage-related measurements, wherein such measurements may be associated with a serving cell and/or a neighboring cell. For instance, it is contemplated that coverage-related measurements may include a reference signal received power, a reference signal received quality, a reference signal strength indication, and/or a user equipment transmit power. Computation component 550 may also configured to perform an averaging of a cell geometry, a path loss in a cell, and/or a signal-to-noise ratio requirement of a user equipment. In another aspect, computation component 550 is further configured to compute an interference coefficient associated with at least one neighbor cell.

Here, it is noted that the coverage report provided by computation component 550 is associated with a coverage provided by at least one cell. For instance, the at least one cell can be a serving cell, a neighboring cell, and/or an extended neighbor cell. Here, with respect to extended neighbor cells, the coverage report may be configurable by a network entity (e.g., a radio resource controller) to include coverage information associated with a particular set of extended neighbor cells. For example, the network entity may dictate that the coverage report be based on coverage-related measurements relating to a set of extended neighbor cells within a threshold number of hops from a serving cell.

In a further aspect, the coverage report generated by computation component 550 can be disseminated to external entities. For instance, communication component 530 may be further configured to communicate the coverage report to a base station. In a particular embodiment, the coverage report is included in a series of coverage reports, wherein communication component 530 is configured to report the series of coverage reports based on a period. Within such embodiment, the period can be configurable by a network entity. In another embodiment, communication component 530 is configured to communicate the coverage report based on a trigger event (e.g., a request for the coverage report) detected by trigger component 560. For this embodiment, trigger component 560 is thus configured to detect any of a plurality of trigger events including, for example, a request for the coverage report, a determination of whether a load in a cell exceeds a threshold, etc.

Figure 6:
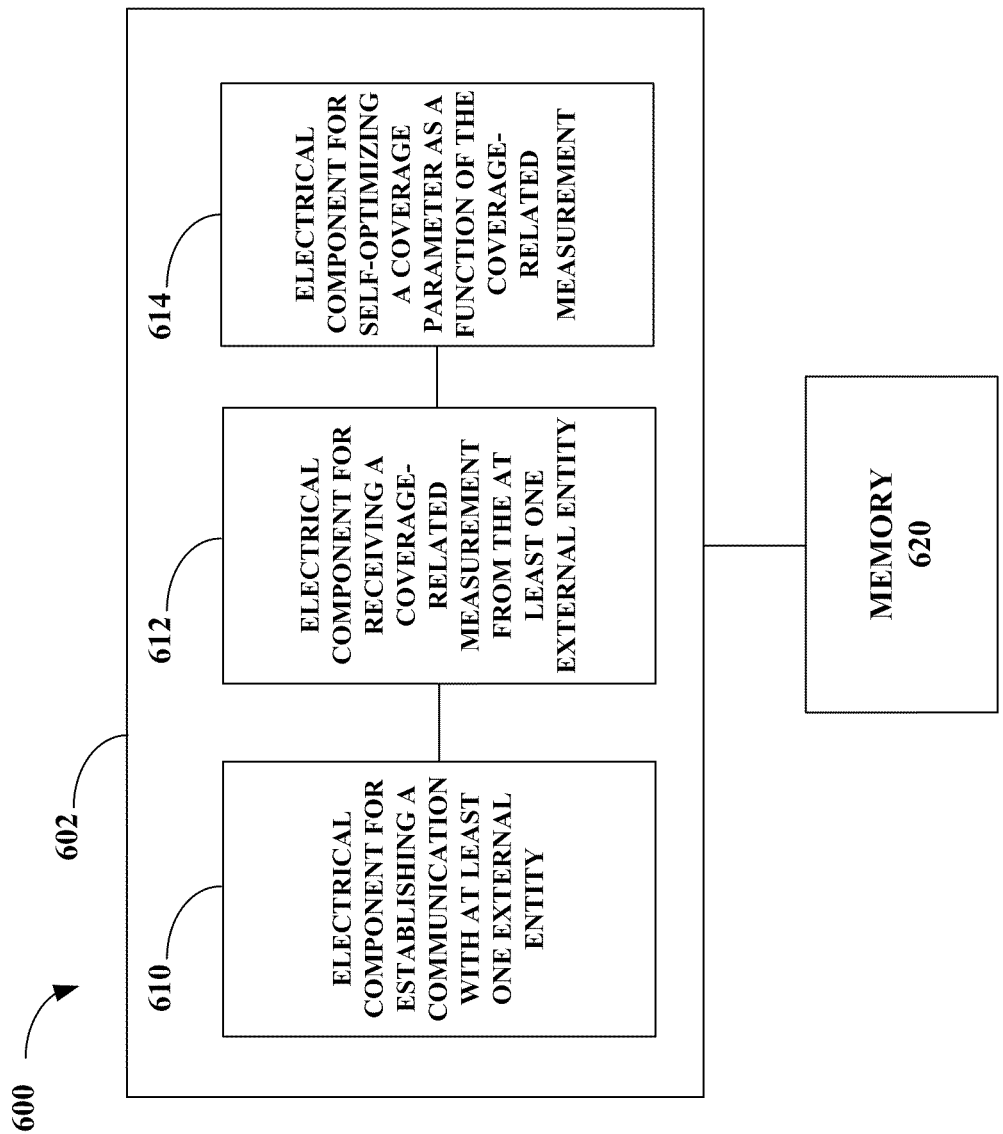
FIG. 6 is an illustration of an exemplary coupling of electrical components that effectuate a distributed coverage optimization according to an embodiment.

Referring next to FIG. 6, illustrated is a system 600 that facilitates a distributed coverage optimization according to an embodiment. System 600 can reside within a base station (e.g., an eNB, HeNB, etc.), for instance. System 600 includes functional blocks that can represent functions implemented by a processor, software, or combination thereof (e.g., firmware), wherein system 600 includes a logical grouping 602 of electrical components that can act in conjunction. As illustrated, logical grouping 602 can include an electrical component for establishing a communication with at least one external entity 610. Furthermore, logical grouping 602 can include an electrical component for receiving a coverage-related measurement from the at least one external entity 612. Logical grouping 602 can also include an electrical component for self-optimizing a coverage parameter as a function of the coverage-related measurement 614. Additionally, system 600 can include a memory 620 that retains instructions for executing functions associated with electrical components 610, 612, and 614. While shown as being external to memory 620, it is to be understood that electrical components 610, 612, and 614 can exist within memory 620.

Figure 7:
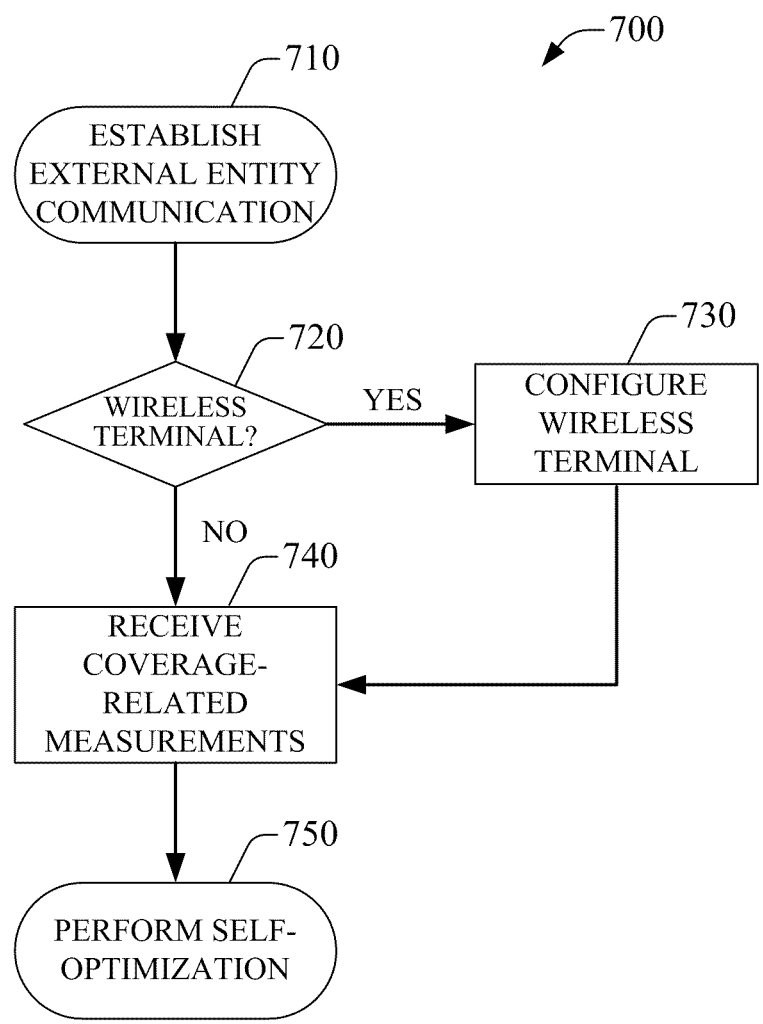
FIG. 7 is a flow chart illustrating an exemplary methodology for performing a self-optimization in accordance with an aspect of the subject specification.

Referring next to FIG. 7, a flow chart illustrating an exemplary method for performing a self-optimization according to an embodiment is provided. As illustrated, process 700 includes a series of acts that may be performed by a base station (e.g., eNB, HeNB, etc.) according to an aspect of the subject specification. For instance, process 700 may be implemented by employing a processor to execute computer executable instructions stored on a computer readable storage medium to implement the series of acts. In another embodiment, a computer-readable storage medium comprising code for causing at least one computer to implement the acts of process 700 are contemplated.

In an aspect, process 700 begins at act 710 with an external entity communication being established. As stated previously, such communication can be a communication with a wireless terminal or base station, for example. Upon establishing the communication, a determination of whether the external entity is a wireless terminal is performed at act 720. If the external entity is indeed a wireless terminal, process 700 proceeds by configuring the wireless terminal at act 730, wherein coverage-related measurements are then subsequently received from the wireless terminal at act 740. Otherwise, if the external entity is not a wireless terminal, process 700 proceeds directly to act 740 where coverage-related measurements are received from a non-wireless terminal external entity (e.g., an eNB serving a neighboring cell). Upon receiving coverage related measurements at act 740, process 700 then concludes at act 750 where a self-CCO is performed based on the received coverage related measurements.

Figure 8:
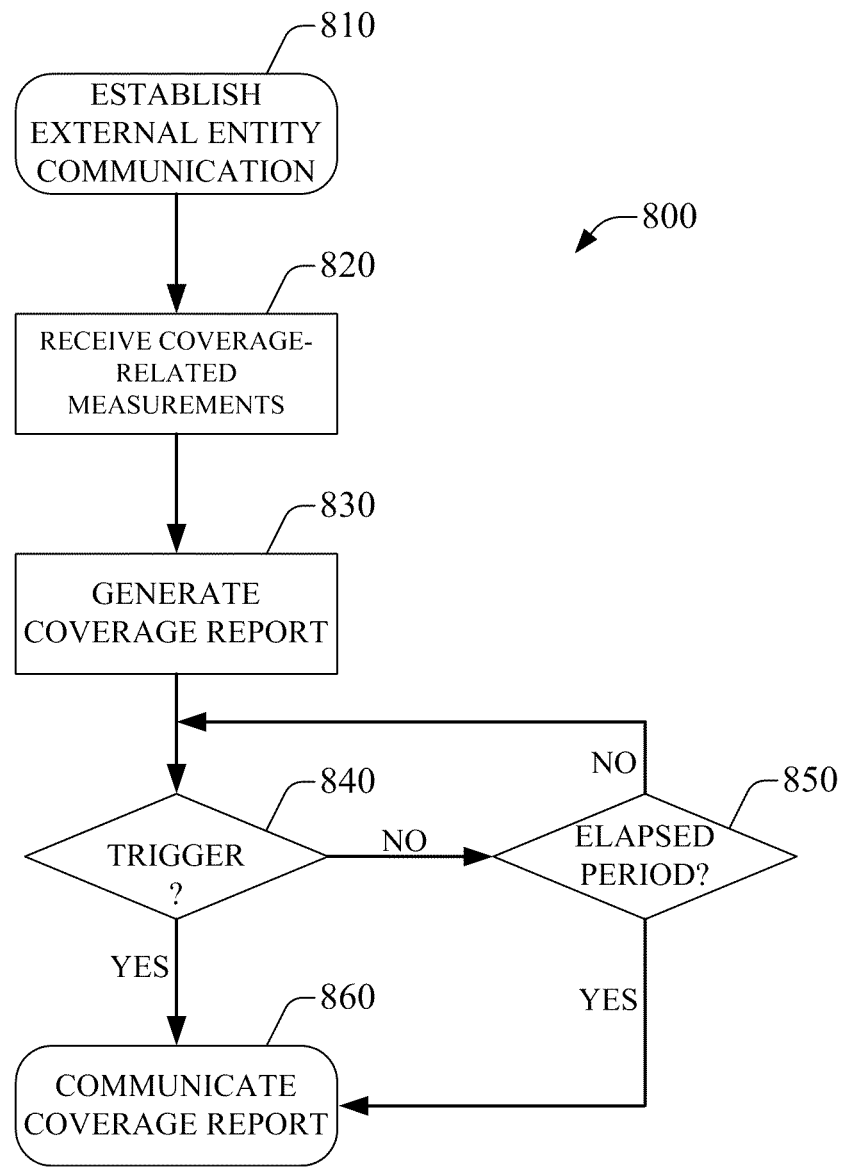
FIG. 8 is a flow chart illustrating an exemplary methodology for disseminating a coverage report in accordance with an aspect of the subject specification.

Referring next to FIG. 8, a flow chart illustrating an exemplary method for disseminating a coverage report is provided. As illustrated, process 800 also includes a series of acts that may be performed by a base station (e.g., eNB, HeNB, etc.) according to an aspect of the subject specification. For instance, process 800 may be implemented by employing a processor to execute computer executable instructions stored on a computer readable storage medium to implement the series of acts. In another embodiment, a computer-readable storage medium comprising code for causing at least one computer to implement the acts of process 800 are contemplated.

In an aspect, similar to process 700, process 800 begins by having the base station establish a communication with an external entity at act 810. Next, at act 820, coverage-related measurements are received from the external entity (e.g., from a wireless terminal, an eNB, an HeNB, etc.), followed by a generation of a coverage report at act 830 based on the received coverage-related measurements. Process 800 then proceeds to act 840 where a determination is made as to whether a trigger event has occurred. Here, it should be noted that detecting a trigger event at act 840 may include monitoring any of a plurality of trigger events including, for example, monitoring a load in a cell. If a trigger event is indeed detected, process 800 concludes at act 860 where the coverage report is communicated to a base station. Otherwise, if a trigger event is not detected, the reporting of coverage reports can be based on a pre-determined periodicity. For instance, in an aspect, process 800 proceeds to act 850 where an elapsed period determination is made. Here, if the period for communicating the coverage report has elapsed, then process 800 concludes with the coverage report being communicated to a base station at act 850. Otherwise, if the period has not yet elapsed, process 800 loops back to act 840 where trigger events are again monitored.

Figure 9:
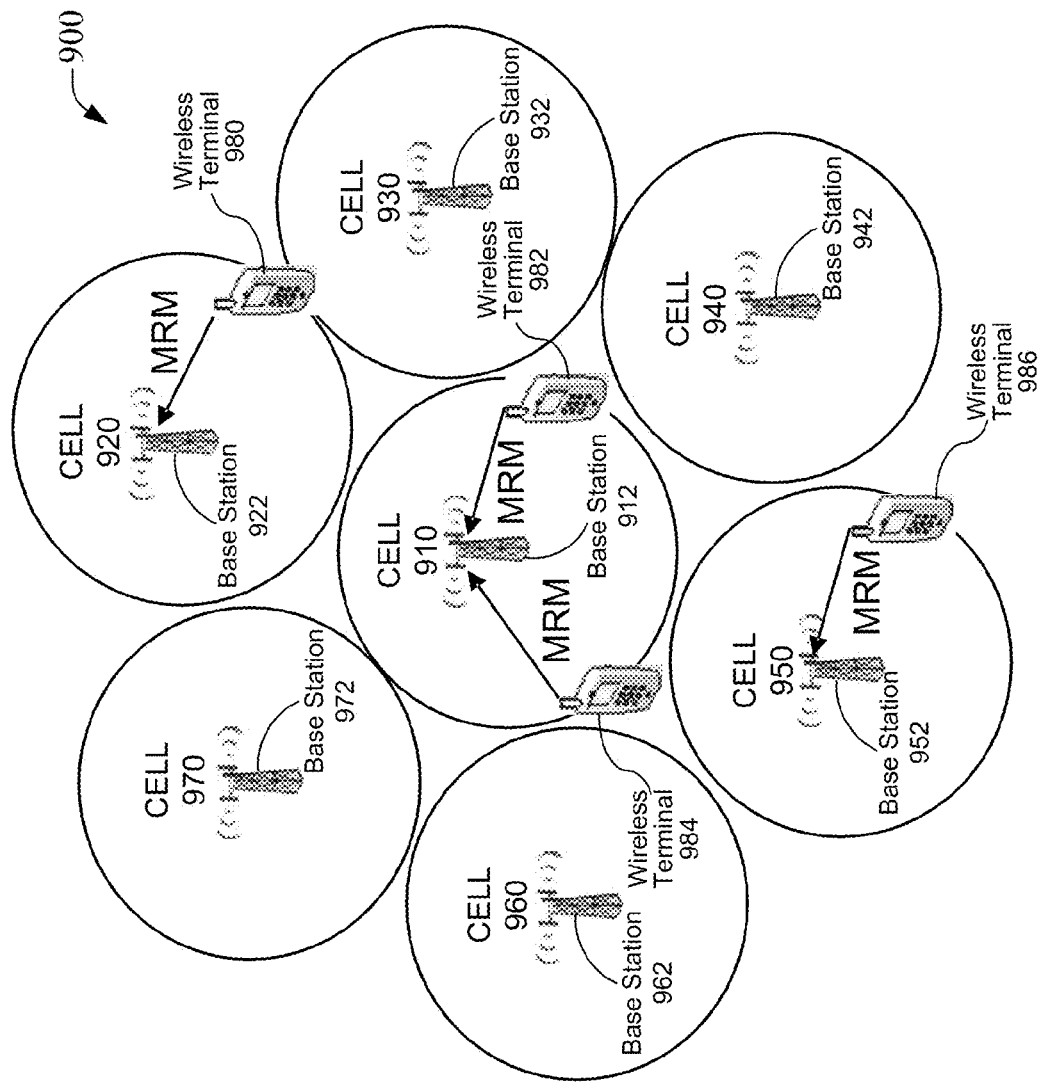
FIG. 9 illustrates an exemplary network that facilitates a distributed coverage optimization according to an embodiment.

Referring next to FIG. 9, an exemplary network that facilitates a distributed coverage optimization is provided. As illustrated, network 900 includes a plurality of cells 910, 920, 930, 940, 950, 960, 970, which are respectively served by base stations 912, 922, 932, 942, 952, 962, 972. In an aspect, coverage statistics ascertained by any of base stations 912, 922, 932, 942, 952, 962, 972 are computed by analyzing MRMs provided by any of wireless terminals 980, 982, 984, 986. For instance, statistics computed by an eNB and exchanged with other eNBs can be a direct aggregation of measurements reported by UEs in MRMs. For example, such computations may include an average/max/min reported RSRP/RSRQ/RSSI of the serving cell, an average/max/min reported RSRP/RSRQ/RSSI of each neighbor, and/or an average/max/min transmit power of a UE.

In a further aspect, statistics computed by an eNB and exchanged with other eNBs can also be obtained by further analysis of MRMs. For this particular embodiment, such computations may, for example, reflect average cell geometry, average path loss in the cell, average signal-to-noise ratio requirement of the UEs in the cell, and/or interference coefficients for each neighbor. Exemplary computations of such parameters may include:

$$IC_{i,j} = \underset{\substack{\text{Average} \\ \text{over all MRMs} \\ \text{recceived in cell } i}}{\text{Average}} \left( \frac{RSRP_j}{RSRP_1} \right)$$

$$G_i = \underset{\substack{\text{Average} \\ \text{over all MRMs} \\ \text{received in cell } i}}{\text{Average}} \frac{\sum_{j \neq i} RSRP_j}{RSRP_1}$$

$$PL_i = \underset{\substack{\text{Average} \\ \text{MRMs recceived} \\ \text{in cell } i}}{\text{Average}} \left( \frac{RST_x Power_i}{RSRP_i} \right)$$

where
$RSRP_i$=RSRP of the cell i reported by UE in MRM
$G_i$=average geometry of cell i
$IC_{i,j}$=interference coefficient of cell j to cell i
$PL_i$=Average path loss in cell i, and
$RST_xPower_i$=Transmit power of the Reference Signal in cell i
and where any of $X_{i,j}$, $G_i$, $PL_i$ can be included in $CSI_i$.

Exemplary Communication System

Figure 10:
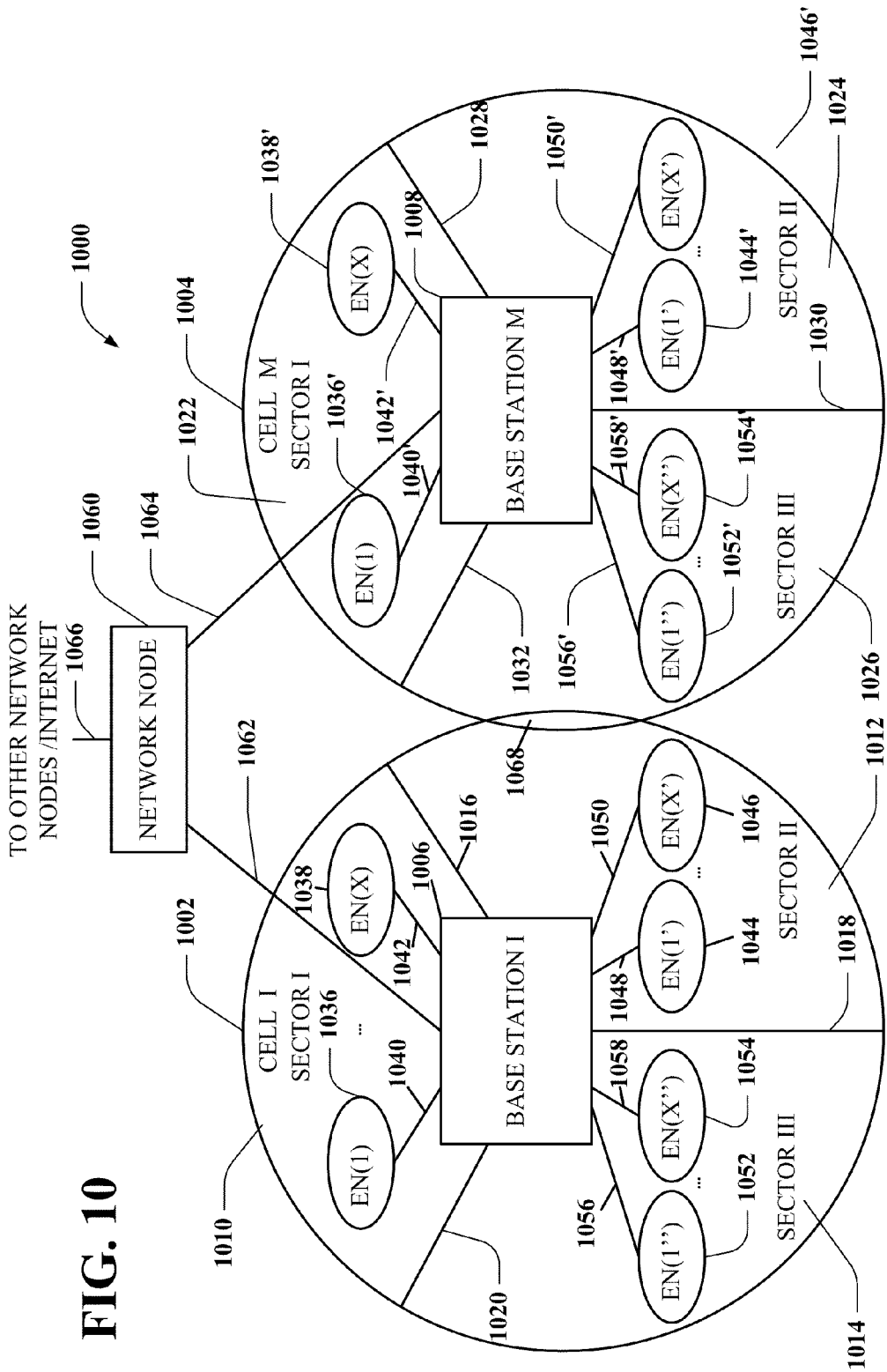
FIG. 10 is an illustration of an exemplary communication system implemented in accordance with various aspects including multiple cells.

Referring next to FIG. 10, an exemplary communication system 1000 implemented in accordance with various aspects is provided including multiple cells: cell I 1002, cell M 1004. Here, it should be noted that neighboring cells 1002, 1004 overlap slightly, as indicated by cell boundary region 1068, thereby creating potential for signal interference between signals transmitted by base stations in neighboring cells. Each cell 1002, 1004 of system 1000 includes three sectors. Cells which have not been subdivided into multiple sectors (N=1), cells with two sectors (N=2) and cells with more than 3 sectors (N>3) are also possible in accordance with various aspects. Cell 1002 includes a first sector, sector I 1010, a second sector, sector II 1012, and a third sector, sector III 1014. Each sector 1010, 1012, and 1014 has two sector boundary regions; each boundary region is shared between two adjacent sectors.

Sector boundary regions provide potential for signal interference between signals transmitted by base stations in neighboring sectors. Line 1016 represents a sector boundary region between sector I 1010 and sector II 1012; line 1018 represents a sector boundary region between sector II 1012 and sector III 1014; line 1020 represents a sector boundary region between sector III 1014 and sector 1 1010. Similarly, cell M 1004 includes a first sector, sector I 1022, a second sector, sector II 1024, and a third sector, sector III 1026. Line 1028 represents a sector boundary region between sector I 1022 and sector II 1024; line 1030 represents a sector boundary region between sector II 1024 and sector III 1026; line 1032 represents a boundary region between sector III 1026 and sector I 1022. Cell 11002 includes a base station (BS), base station I 1006, and a plurality of end nodes (ENs) in each sector 1010, 1012, 1014. Sector I 1010 includes EN(1) 1036 and EN(X) 1038 coupled to BS 1006 via wireless links 1040, 1042, respectively; sector II 1012 includes EN(1') 1044 and EN(X') 1046 coupled to BS 1006 via wireless links 1048, 1050, respectively; sector III 1014 includes EN(1") 1052 and EN(X") 1054 coupled to BS 1006 via wireless links 1056, 1058, respectively. Similarly, cell M 1004 includes base station M 1008, and a plurality of end nodes (ENs) in each sector 1022, 1024, and 1026. Sector I 1022 includes EN(1) 1036' and EN(X) 1038' coupled to BS M 1008 via wireless links 1040', 1042', respectively; sector II 1024 includes EN(1') 1044' and EN(X') 1046' coupled to BS M 1008 via wireless links 1048', 1050', respectively; sector 3 1026 includes EN(1") 1052' and EN(X") 1054' coupled to BS 1008 via wireless links 1056', 1058', respectively.

System 1000 also includes a network node 1060 which is coupled to BS I 1006 and BS M 1008 via network links 1062, 1064, respectively. Network node 1060 is also coupled to other network nodes, e.g., other base stations, AAA server nodes, intermediate nodes, routers, etc. and the Internet via network link 1066. Network links 1062, 1064, 1066 may be, e.g., fiber optic cables. Each end node, e.g. EN 1 1036 may be a wireless terminal including a transmitter as well as a receiver. The wireless terminals, e.g., EN(1) 1036 may move through system 1000 and may communicate via wireless links with the base station in the cell in which the EN is currently located. The wireless terminals, (WTs), e.g. EN(1) 1036, may communicate with peer nodes, e.g., other WTs in system 1000 or outside system 1000 via a base station, e.g. BS 1006, and/or network node 1060. WTs, e.g., EN(1) 1036 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 11:
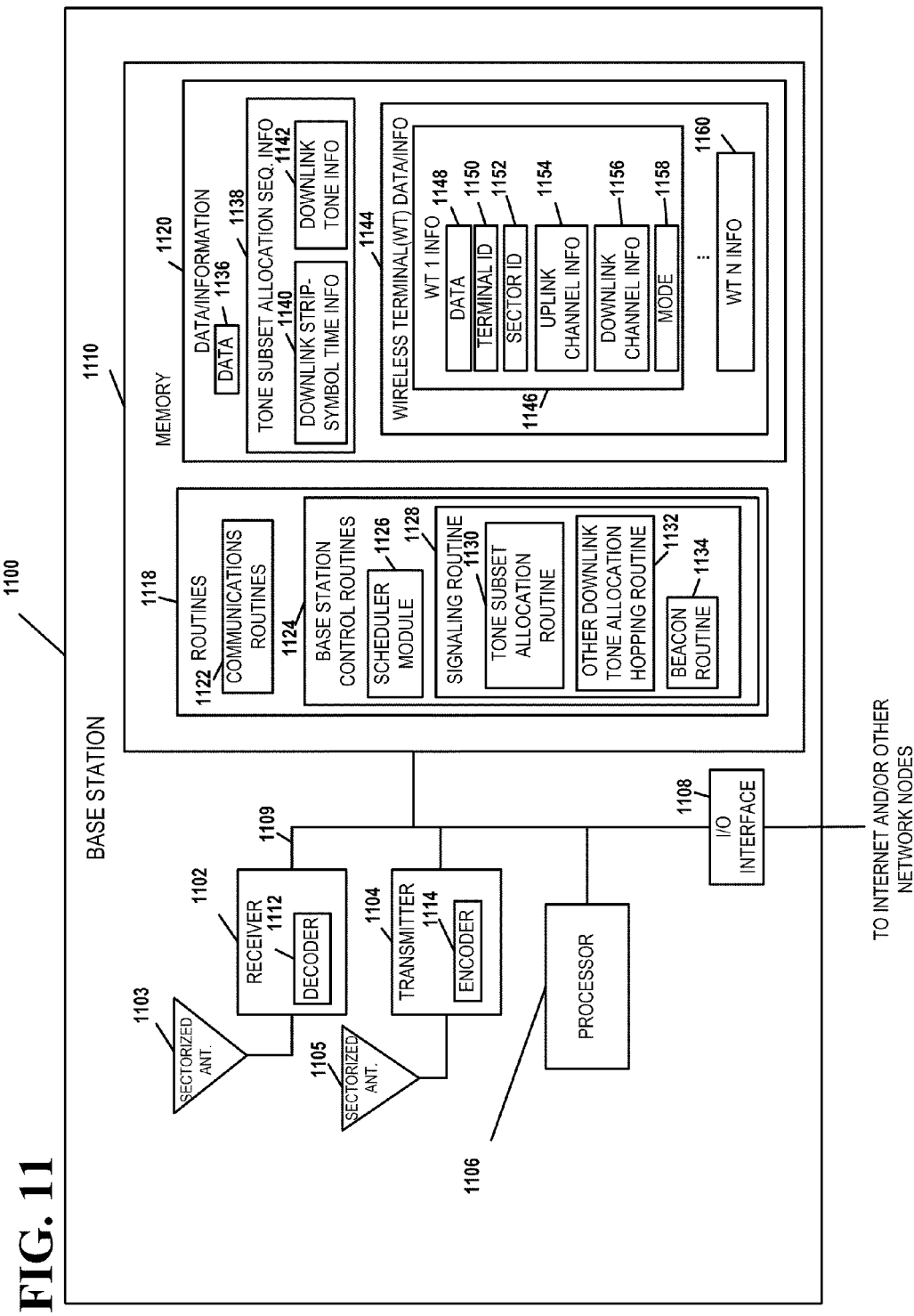
FIG. 11 is an illustration of an exemplary base station in accordance with various aspects described herein.

FIG. 11 illustrates an example base station 1100 in accordance with various aspects. Base station 1100 implements tone subset allocation sequences, with different tone subset allocation sequences generated for respective different sector types of the cell. Base station 1100 may be used as any one of base stations 1006, 1008 of the system 1000 of FIG. 10. The base station 1100 includes a receiver 1102, a transmitter 1104, a processor 1106, e.g., CPU, an input/output interface 1108 and memory 1110 coupled together by a bus 1109 over which various elements 1102, 1104, 1106, 1108, and 1110 may interchange data and information.

Sectorized antenna 1103 coupled to receiver 1102 is used for receiving data and other signals, e.g., channel reports, from wireless terminals transmissions from each sector within the base station's cell. Sectorized antenna 1105 coupled to transmitter 1104 is used for transmitting data and other signals, e.g., control signals, pilot signal, beacon signals, etc. to wireless terminals 1200 (see FIG. 12) within each sector of the base station's cell. In various aspects, base station 1100 may employ multiple receivers 1102 and multiple transmitters 1104, e.g., an individual receivers 1102 for each sector and an individual transmitter 1104 for each sector. Processor 1106, may be, e.g., a general purpose central processing unit (CPU). Processor 1106 controls operation of base station 1100 under direction of one or more routines 1118 stored in memory 1110 and implements the methods. I/O interface 1108 provides a connection to other network nodes, coupling the BS 1100 to other base stations, access routers, AAA server nodes, etc., other networks, and the Internet. Memory 1110 includes routines 1118 and data/information 1120.

Data/information 1120 includes data 1136, tone subset allocation sequence information 1138 including downlink strip-symbol time information 1140 and downlink tone information 1142, and wireless terminal (WT) data/info 1144 including a plurality of sets of WT information: WT 1 info 1146 and WT N info 1160. Each set of WT info, e.g., WT 1 info 1146 includes data 1148, terminal ID 1150, sector ID 1152, uplink channel information 1154, downlink channel information 1156, and mode information 1158.

Routines 1118 include communications routines 1122 and base station control routines 1124. Base station control routines 1124 includes a scheduler module 1126 and signaling routines 1128 including a tone subset allocation routine 1130 for strip-symbol periods, other downlink tone allocation hopping routine 1132 for the rest of symbol periods, e.g., non strip-symbol periods, and a beacon routine 1134.

Data 1136 includes data to be transmitted that will be sent to encoder 1114 of transmitter 1104 for encoding prior to transmission to WTs, and received data from WTs that has been processed through decoder 1112 of receiver 1102 following reception. Downlink strip-symbol time information 1140 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1142 includes information including a carrier frequency assigned to the base station 1100, the number and frequency of tones, and the set of tone subsets to be allocated to the strip-symbol periods, and other cell and sector specific values such as slope, slope index and sector type.

Data 1148 may include data that WT1 1200 has received from a peer node, data that WT 1 1200 desires to be transmitted to a peer node, and downlink channel quality report feedback information. Terminal ID 1150 is a base station 1100 assigned ID that identifies WT 1 1200. Sector ID 1152 includes information identifying the sector in which WT1 1200 is operating. Sector ID 1152 can be used, for example, to determine the sector type. Uplink channel information 1154 includes information identifying channel segments that have been allocated by scheduler 1126 for WT1 1200 to use, e.g., uplink traffic channel segments for data, dedicated uplink control channels for requests, power control, timing control, etc. Each uplink channel assigned to WT1 1200 includes one or more logical tones, each logical tone following an uplink hopping sequence. Downlink channel information 1156 includes information identifying channel segments that have been allocated by scheduler 1126 to carry data and/or information to WT1 1200, e.g., downlink traffic channel segments for user data. Each downlink channel assigned to WT1 1200 includes one or more logical tones, each following a downlink hopping sequence. Mode information 1158 includes information identifying the state of operation of WT1 1200, e.g. sleep, hold, on.

Communications routines 1122 control the base station 1100 to perform various communications operations and implement various communications protocols. Base station control routines 1124 are used to control the base station 1100 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1128 controls the operation of receiver 1102 with its decoder 1112 and transmitter 1104 with its encoder 1114. The signaling routine 1128 is responsible controlling the generation of transmitted data 1136 and control information. Tone subset allocation routine 1130 constructs the tone subset to be used in a strip-symbol period using the method of the aspect and using data/info 1120 including downlink strip-symbol time info 1140 and sector ID 1152. The downlink tone subset allocation sequences will be different for each sector type in a cell and different for adjacent cells. The WTs 1200 receive the signals in the strip-symbol periods in accordance with the downlink tone subset allocation sequences; the base station 1100 uses the same downlink tone subset allocation sequences in order to generate the transmitted signals. Other downlink tone allocation hopping routine 1132 constructs downlink tone hopping sequences, using information including downlink tone information 1142, and downlink channel information 1156, for the symbol periods other than the strip-symbol periods. The downlink data tone hopping sequences are synchronized across the sectors of a cell. Beacon routine 1134 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 12:
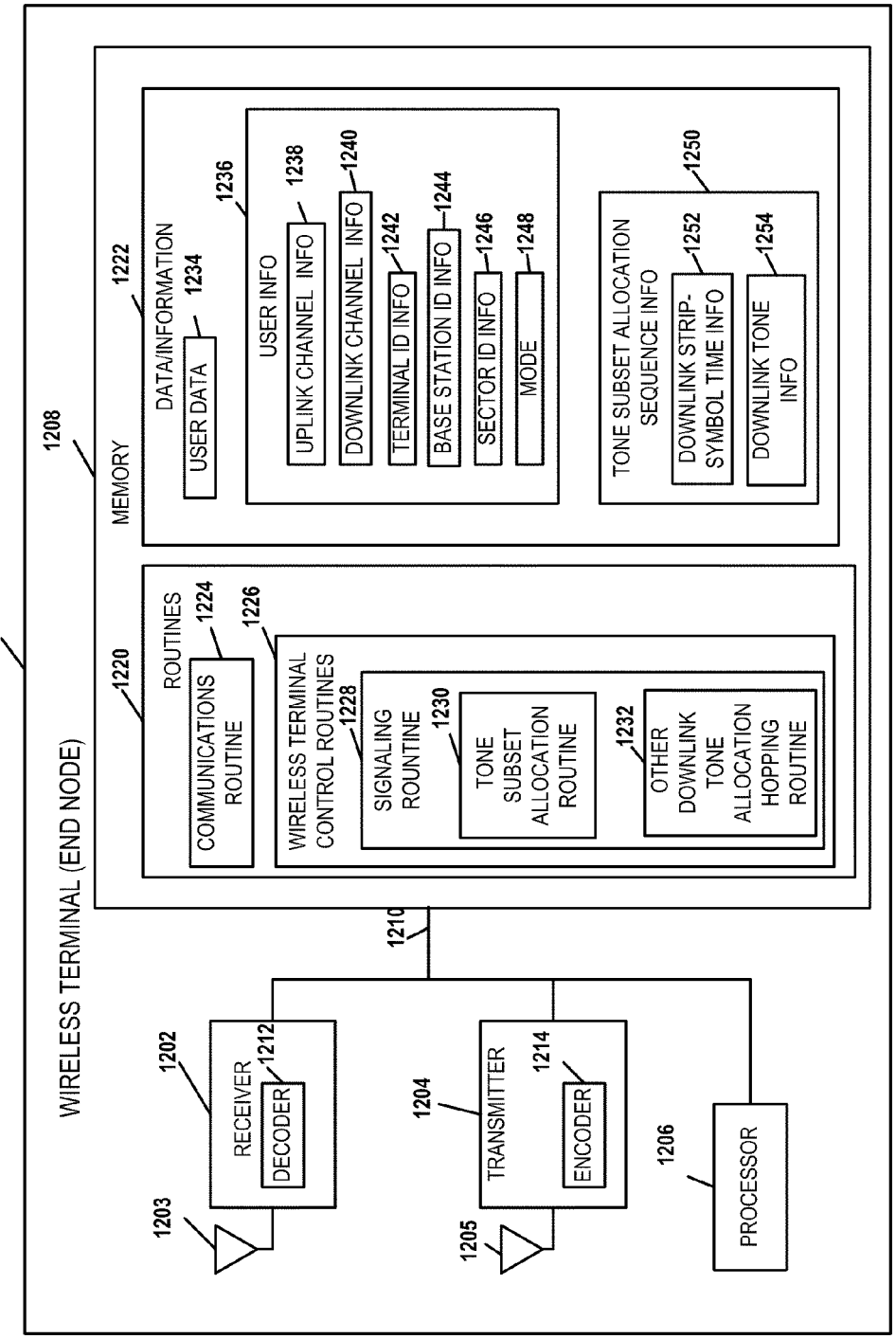
FIG. 12 is an illustration of an exemplary wireless terminal implemented in accordance with various aspects described herein.

FIG. 12 illustrates an example wireless terminal (end node) 1200 which can be used as any one of the wireless terminals (end nodes), e.g., EN(1) 1036, of the system 1000 shown in FIG. 10. Wireless terminal 1200 implements the tone subset allocation sequences. The wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (and/or a disparate wireless terminal) is coupled to receiver 1202. An antenna 1205 used for transmitting signals, e.g., to a base station (and/or a disparate wireless terminal) is coupled to transmitter 1204.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by a base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by a base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station-assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. The signaling routine 1228 includes a tone subset allocation routine 1230 for the strip-symbol periods and an other downlink tone allocation hopping routine 1232 for the rest of symbol periods, e.g., non strip-symbol periods. Tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some aspects and process received data transmitted from the base station. Other downlink tone allocation hopping routine 1230 constructs downlink tone hopping sequences, using information including downlink tone information 1254, and downlink channel information 1240, for the symbol periods other than the strip-symbol periods. Tone subset allocation routine 1230, when executed by processor 1206, is used to determine when and on which tones the wireless terminal 1200 is to receive one or more strip-symbol signals from the base station 1100. The uplink tone allocation hopping routine 1230 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method for providing a distributed coverage optimization, the method comprising:
    establishing communication with a wireless terminal and a first base station;
    configuring the wireless terminal to collect coverage-related measurements;
    receiving a first portion of a plurality of coverage-related measurements from the wireless terminal and a second portion of the plurality of coverage-related measurements from the first base station;
    determining coverage-related statistics based on the plurality of coverage-related measurements, wherein the coverage-related statistics are associated with an average cell geometry;
    self-optimizing a coverage parameter as a function of the plurality of coverage-related measurements; and
    communicating a coverage report that comprises the coverage-related statistics to the first base station or a second base station.

2. The method of claim 1, wherein the communication with the first base station is established via a backhaul connection with the first base station.

3. The method of claim 1, further comprising generating the coverage report based on the plurality of coverage-related measurements.

4. The method of claim 1, wherein the coverage-related statistics are associated with at least one of a coverage quality, a received power, a received interference power, a user equipment transmit power, or a path loss.

5. The method of claim 4, wherein the received interference power is a received downlink interference power from a specific neighbor.

6. The method of claim 1, wherein determining the coverage-related statistics comprises aggregating the coverage-related measurements and computing at least one of an average, a maximum, or a minimum across the coverage-related measurements.

7. The method of claim 6, wherein at least one of a reference signal received power, a reference signal received quality, or a reference signal strength indication is associated with a serving cell.

8. The method of claim 6, wherein at least one of a reference signal received power, a reference signal received quality, or a reference signal strength indication is associated with a neighboring cell.

9. The method of claim 6, wherein determining the coverage-related statistics further comprises analyzing the coverage-related measurements to determine at least one additional parameter that is not directly included in the coverage-related measurements.

10. The method of claim 6, the computing comprising computing an interference coefficient associated with at least one neighbor cell.

11. The method of claim 3, wherein the coverage report is associated with a coverage provided by at least one cell.

12. The method of claim 11, wherein the at least one cell is a neighboring cell.

13. The method of claim 11, wherein the at least one cell is an extended neighbor cell.

14. The method of claim 13, wherein the coverage report is configurable by a network entity to include coverage information associated with a set of extended neighbor cells within a threshold number of hops from a serving cell.

15. The method of claim 1, wherein the coverage report is included in a series of coverage reports, and wherein the communicating comprises reporting the series of coverage reports based on a period.

16. The method of claim 15, wherein the period is configurable by a network entity.

17. The method of claim 1, further comprising detecting a trigger event, the communicating based on the trigger event.

18. The method of claim 17, wherein the trigger event is a request for the coverage report.

19. The method of claim 17, further comprising monitoring a load in a cell, wherein the detecting comprises determining whether the load exceeds a threshold.

20. An apparatus configured to provide a distributed coverage optimization, the apparatus comprising:
    a processor configured to execute computer executable components stored in memory, the components including:
        a communication component that configures a wireless terminal to collect coverage-related measurements, that receives a first portion of a plurality of coverage-related measurements from the wireless terminal and a second portion of the plurality of coverage-related measurements from a first base station, and that communicates a coverage report that comprises coverage-related statistics to the first base station or a second base station, wherein the coverage-related statistics are based on the plurality of coverage-related measurements, wherein the coverage-related statistics are associated with an average cell geometry;
        a computation component that determines the coverage-related statistics based on the plurality of coverage-related measurements; and
        an optimization component that self-optimizes a coverage parameter as a function of the plurality of coverage-related measurements.

21. The apparatus of claim 20, wherein configuring the wireless terminal to collect the coverage-related measurement comprises providing the wireless terminal with configuration data.

22. The apparatus of claim 20, wherein the communication component establishes a backhaul connection with the first base station.

23. The apparatus of claim 20, wherein the coverage-related statistics are associated with at least one of a coverage quality, a received power, a received interference power, a user equipment transmit power, or a path loss.

24. The apparatus of claim 23, wherein the received interference power is a received downlink interference power from a specific neighbor.

25. The apparatus of claim 20, wherein the computation component computes at least one of an average, a maximum, or a minimum across at least one of a reference signal received power, a reference signal received quality, a reference signal strength indication, or a user equipment transmit power.

26. The apparatus of claim 25, wherein at least one of the reference signal received power, the reference signal received quality, or the reference signal strength indication is associated with a serving cell.

27. The apparatus of claim 25, wherein at least one of the reference signal received power, the reference signal received quality, or the reference signal strength indication is associated with a neighboring cell.

28. The apparatus of claim 20, wherein the computation component performs an averaging of at least one of a cell geometry, a path loss in a cell, or a signal-to-noise ratio requirement of a user equipment.

29. The apparatus of claim 20, wherein the computation component computes an interference coefficient associated with at least one neighbor cell.

30. The apparatus of claim 20, wherein the coverage report is associated with a coverage provided by at least one cell.

31. The apparatus of claim 30, wherein the at least one cell is a neighboring cell.

32. The apparatus of claim 30, wherein the at least one cell is an extended neighbor cell.

33. The apparatus of claim 32, wherein the coverage report is configurable by a network entity to include coverage information associated with a set of extended neighbor cells within a threshold number of hops from a serving cell.

34. The apparatus of claim 20, the communication component communicates the coverage report to the first base station.

35. The apparatus of claim 34, wherein the coverage report is included in a series of coverage reports, and wherein the communication component reports the series of coverage reports based on a period.

36. The apparatus of claim 35, wherein the period is configurable by a network entity.

37. The apparatus of claim 34, further comprising a trigger component that detects a trigger event, wherein the communication component communicates the coverage report based on the trigger event.

38. The apparatus of claim 37, wherein the trigger event is a request for the coverage report.

39. The apparatus of claim 37, the trigger component determines whether a load in a cell exceeds a threshold.

40. A non-transitory computer-readable storage medium comprising code for causing at least on computer to:

establish communication with a wireless terminal and a first base station;
configure the wireless terminal to collect coverage-related measurements;
receive a first portion of a plurality of coverage-related measurements from the wireless terminal and a second portion of the plurality of coverage-related measurements from the first base station;
determine coverage-related statistics based on the plurality of coverage-related measurements, wherein the coverage-related statistics are associated with an average cell geometry;
self-optimize a coverage parameter as a function of the plurality of coverage-related measurements; and
communicate a coverage report that comprises the coverage-related statistics to the first base station or a second base station.

41. An apparatus configured to provide a distributed coverage optimization, the apparatus comprising:
means for establishing communication with a wireless terminal and a first base station;
means for configuring the wireless terminal to collect coverage-related measurements;
means for receiving a first portion of a plurality of coverage-related measurements from the wireless terminal and a second portion of the plurality of coverage-related measurements from the first base station;
means for determining coverage-related statistics based on the plurality of coverage-related measurements;
means for self-optimizing a coverage parameter as a function of the plurality of coverage-related measurements, wherein the coverage-related statistics are associated with an average cell geometry; and
means for communicating a coverage report that comprises the coverage-related statistics to the first base station or a second base station.

42. The apparatus of claim 41, wherein the coverage report is associated with a coverage provided by at least one cell.

43. The apparatus of claim 41, wherein the coverage-related statistics are associated with at least one of a coverage quality, a received power, a received interference power, a user equipment transmit power, or a path loss.

* * * * *